Figure 1:
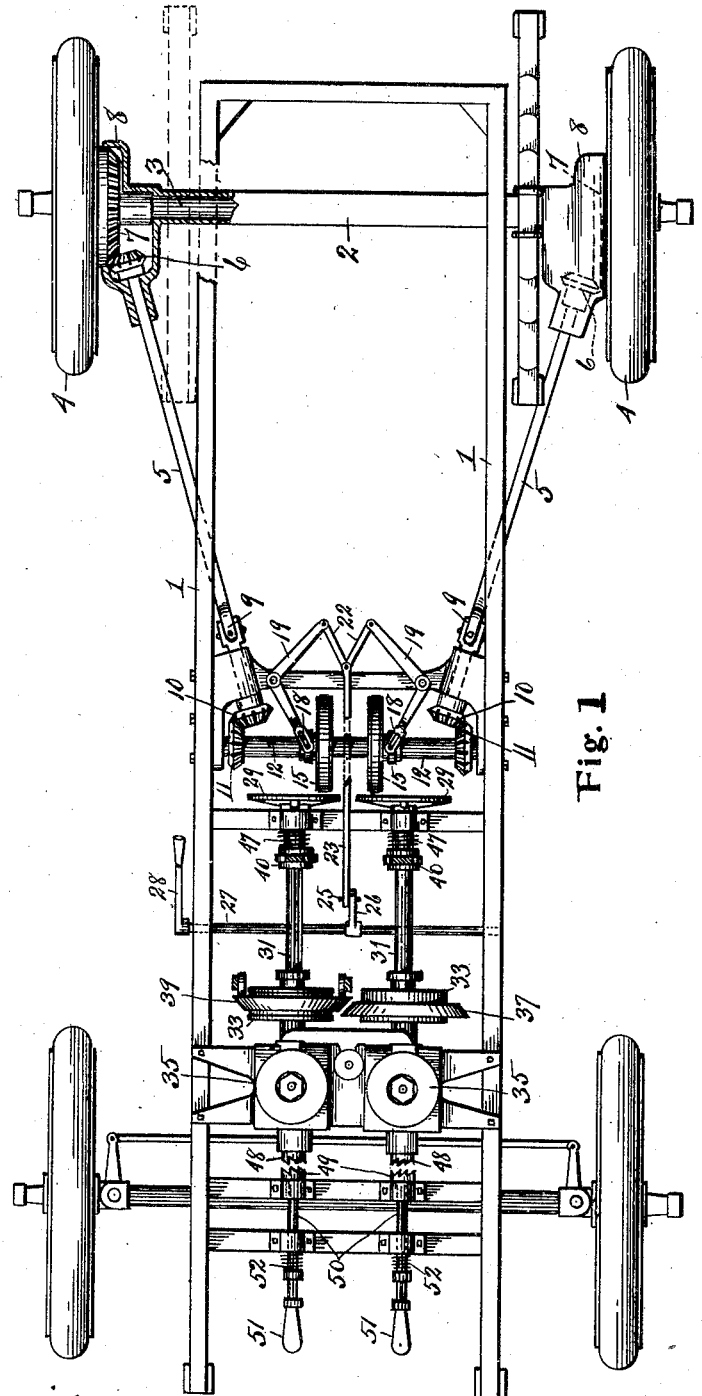

K. A. KENDRICK.
POWER TRANSMISSION MECHANISM.
APPLICATION FILED NOV. 4, 1909.

972,385.

Patented Oct. 11, 1910.
2 SHEETS—SHEET 1.

Witnesses
O. B. Baenziger.
J. G. Howlett.

Inventor
Karl A. Kendrick.
By T. W. Wheeler & Co.
Attorneys

K. A. KENDRICK.
POWER TRANSMISSION MECHANISM.
APPLICATION FILED NOV. 4, 1909.
972,385.
Patented Oct. 11, 1910.
2 SHEETS—SHEET 2.
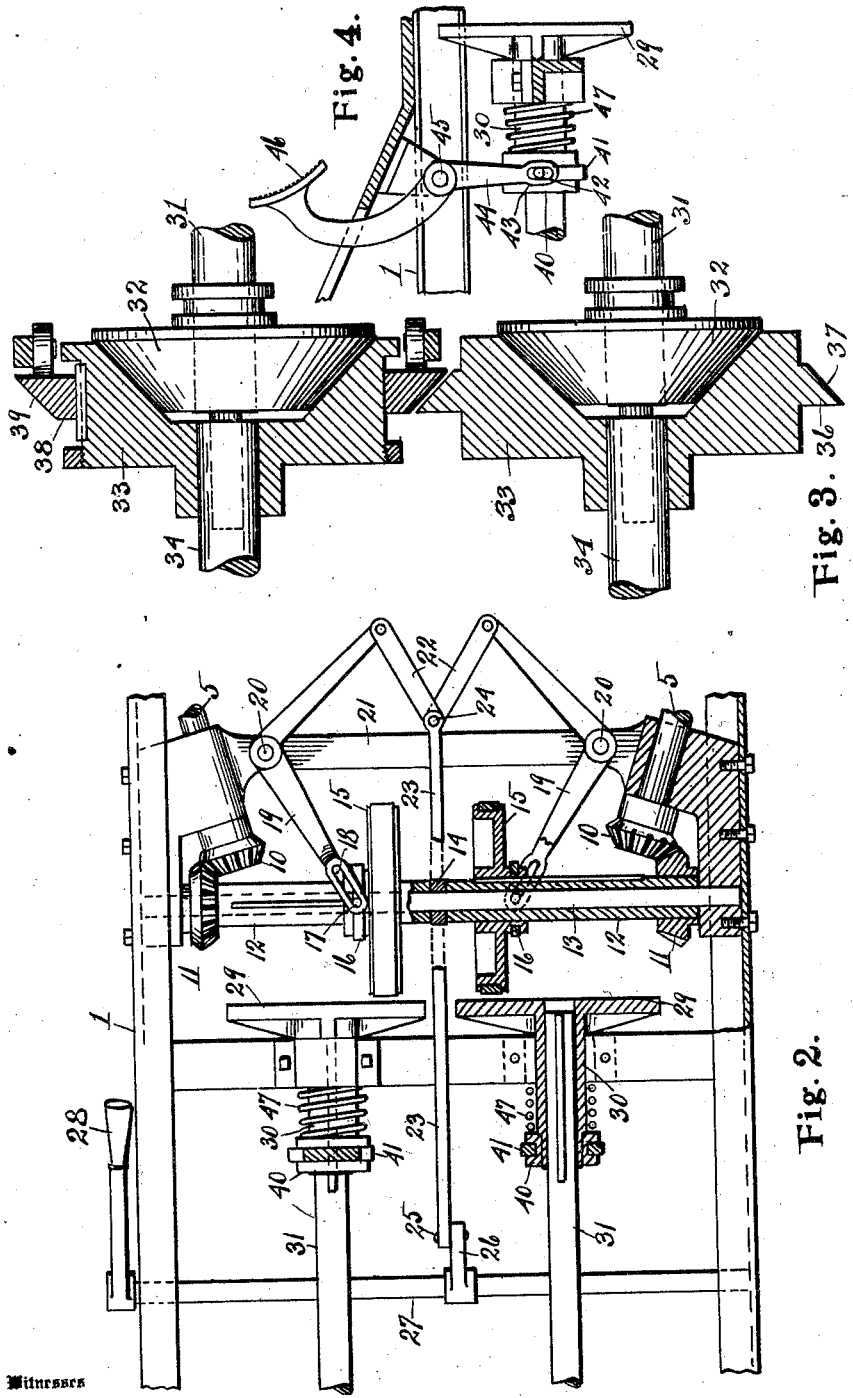

UNITED STATES PATENT OFFICE.

KARL A. KENDRICK, OF DETROIT, MICHIGAN, ASSIGNOR OF ONE-HALF TO HARRISON GEER, OF DETROIT, MICHIGAN.

POWER-TRANSMISSION MECHANISM.

972,385.   Specification of Letters Patent.   Patented Oct. 11, 1910.

Application filed November 4, 1909.   Serial No. 526,164.

*To all whom it may concern:*

Be it known that I, KARL A. KENDRICK, a citizen of the United States, residing at Detroit, in the county of Wayne, State of Michigan, have invented certain new and useful Improvements in Power-Transmission Mechanisms; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to power transmission mechanisms for motor vehicles, and consists in the construction and arrangement of parts hereinafter more fully set forth and pointed out particularly in the claims.

The object of the invention is to provide two independent motors for driving independently the traction wheels of a motor vehicle in a manner to obviate the use of the differential gearing usually employed, the arrangement being such as to provide for actuating the transmission mechanism of each of said motors simultaneously through the operation of a single lever.

The above object is attained by the structure illustrated in the accompanying drawings, in which:—

Figure 1 is a plan view of the frame of a motor vehicle, showing one mode of applying my invention, parts appearing in section. Fig. 2 is an enlarged fragmentary detail partly in section of the transmission mechanism. Fig. 3 is an enlarged sectional view through the cone clutches employed to connect the motors with the driven shafts, showing the slidable friction ring on one of the clutch members connected to one of the motor shafts adapted to engage a corresponding fixed ring on the clutch member secured to the other motor shaft, for the purpose of connecting the motors through their shafts, when desired. Fig. 4 is a detail in section showing the foot lever employed to actuate the slidable friction disk on each of the clutch driven shafts.

Referring to the characters of reference, 1 designates the frame of a motor vehicle. At the rear of said frame is a casing 2 through which passes the rear axle 3, said axle being non-rotative and having loosely journaled on its ends the traction wheels 4. These wheels are independently driven by means of the diverging shafts 5 through the medium of the beveled gears 6 and 7 located in the housings 8 at the ends of the casing 2. Each of the shafts 5 is provided with a universal joint 9 and with a beveled pinion 10 at its forward end which meshes with a like pinion 11 fixed to a rotary sleeve 12 journaled upon the transverse shaft 13 (see Fig. 2). The rotatable sleeves 12 are separated at their inner ends by a dividing collar 14 and splined to each of said sleeves to slide thereon and rotate therewith is a friction wheel 15. In the hub of each of said wheels is a channel in which freely lies a ring 16 within which said hub rotates. Projecting from the opposite sides of each of said rings are the pins 17 which lie in the slots 18 formed in the bifurcated or forked end of the bell-crank levers 19 which are fulcrumed at 20 to the cross bar 21 of the frame. Pivoted to the outer end of each of the bell-crank levers 19 is a link 22. The inner ends of said links are pivoted together and to the rear end of a rod 23, as shown at 24. The forward end of the rod 23 is pivotally coupled at 25 to an arm 26 on a rock shaft 27 journaled in the frame and carrying at one end an operating lever 28. By this arrangement it will now be understood that through an operation of the lever 28 the shaft 27 will be rocked to move the rod 23 longitudinally and swing the bell-crank levers 19 upon their fulcrums to slide the friction wheels simultaneously along the rotary sleeves 12 upon which they are mounted, the arrangement being such that said disks are moved an equal distance in either direction in which they may be actuated by a movement of said levers.

Disposed before each of the friction wheels 15 at right angles thereto is a friction disk 29 having an extension hub 30 which is splined on one end of a clutch driven shaft 31. On the end of each of the shafts 31 opposite to that carrying the disk 29 is a male clutch member 32 in the form of a truncated cone which is splined to said shaft so as to adapt it for longitudinal movement thereon as well as a rotary movement therewith. Adapted to receive the conical clutch members 32 are the female clutch members 33 fixed on the ends of the motor shafts 34 which are independently driven by the separate motors 35. To disengage each of the male clutch members 32 from its corresponding female clutch member, said male clutch member is moved longitudinally of its shaft by any of the devices in common use, not shown herein, as such devices are well understood in the art. Upon one of the clutch members 33 is a fixed ring 36 having a beveled friction face 37. Upon the other of said clutch members 33 is a splined friction ring 38 having a beveled friction face 39 adapted by a movement thereof to be carried into engagement with the friction ring 36 of the opposite clutch member to directly connect the motor shafts and cause the motors to turn in unison, when desired. The coöperation of the friction rings 37 and 39 involves considerable slippage which fact alone makes possible the function attained by their use. Were said rings provided with gear teeth, their coöperation in the manner desired, would be impossible owing to the fact that they would lock. The means for actuating the slidable friction ring 38 to connect and disconnect the motor shafts is not shown herein, but may be readily understood by reference to my pending application, Serial No. 513,378, wherein it is fully shown and described.

Upon the inner end of the hub of each of the disks 29 is a collar 40 having a channel in which is located a rotatable ring 41 having projecting pins 42 (see Fig. 4) which lie in slotted openings 43 in the lower ends of the lever 44 fulcrumed at 45 and having upon the end thereof projecting upwardly from said fulcrum a pedal 46 through the medium of which the hub of the disk 29 may be caused to slide upon the shaft 31 to carry the face of said disk into contact with its corresponding friction wheel 15 and impart motion through said wheel and shaft 5 to one of the rear traction wheels. Embracing the hub of each of the friction disks 29 is a coiled spring 47 whose tension is normally exerted to hold said disk from engagement with its friction wheel 15, as shown in Fig. 2. By an application of pressure to the pedal 46, the tension of said spring may be overcome and the disk moved longitudinally of its shaft so as to carry it into frictional engagement with the wheel 15. It will be understood that each of the disks 29 will be controlled by a pedal 46 which pedals will be located close together so as to enable either one of the disks 29 to be actuated independently or both of the disks to be actuated together, as may be desired. It will also be understood that a constant pressure against the pedals 46 will be necessary while the device is in operation.

When the shafts 31 are being driven by the motors (which it will be noted turn in opposite directions), the disks 29 will be revolved with said shafts. By a movement of the pedals, said disks may be carried into engagement with the friction wheels 15 to drive said wheels and transmit motion from the motors therethrough to the traction wheels by means of the radial shafts 5. The speed at which the vehicle can be driven may be readily varied by sliding the friction wheels 15 along the sleeves 12 through the operation of the lever 28, enabling the vehicle to be started at slow speed by sliding the wheels 15 to a point adjacent the centers of the disks 29. By sliding the wheels 15 radially of the disks 29 from the center toward the perimeter thereof, the speed at which the vehicle is driven may be readily increased. By moving the wheels 15 across the centers of the disks 29 to the opposite sides thereof, the direction of travel of the vehicle may be reversed.

The single lever 28 controlling as it does the frictional transmission mechanisms of both motors so as to actuate said mechanisms in unison, and said mechanisms being arranged to drive their respective traction wheels at the same rate of speed when occupying the same relative position, the speed at which the two traction wheels are driven is changed concurrently and at the same ratio, as the disks of the two transmission devices are shifted through a manipulation of the lever 28. Should one of the transmitting devices become disabled, or for any other cause, if it be desired to combine the power of the two motors and apply said combined power to either one of the shafts 5, said motors may be connected to cause them to turn in unison by means of the friction rings 36 and 38, when, by disconnecting one of the transmitting devices, or one of the driving clutches, and connecting the other, the combined power of the motors may be applied to either one of the traction wheels.

The motors 35 are of the well known explosive engine type and the shafts of said motors at their outer ends are provided with jaw clutches 48 having beveled jaws adapted to be engaged by like jaws 49 on the inner ends of the alined crank shafts 50 which are slidable longitudinally to bring the jaw members thereon into engagement with the corresponding jaw members of the motor shafts. The crank shafts are each provided with a crank 51 and with a compressible spring 52 to return said shafts longitudinally, after the operation of cranking the engines or motors, to automatically disengage said clutches.

Having thus fully set forth my invention, what I claim as new and desire to secure by Letters Patent, is:—

1. Power transmitting mechanism for motor vehicles comprising two independent motors, two traction wheels, means for transmitting the power from each of said motors independently to one of said wheels, a single lever connected to and controlling both of said power transmitting devices of said motors, and means for disconnecting said transmitting devices from their motors, respectively.

2. Power transmitting mechanism comprising two independent motors, two independent transmitting devices connected to said motors, means for disconnecting said transmitting devices from said motors respectively, two traction wheels, means independently connecting each of said transmitting devices with one of said traction wheels, and a single lever connected with said transmitting devices.

3. Power transmitting mechanism comprising two independent motors, two transmitting devices operatively connected to said motors, two traction wheels, means connecting said transmitting devices to said traction wheels independently, means for actuating said transmitting devices in unison to cause them to drive their respective traction wheels at the same rate of speed, and means for disconnecting either of said transmitting devices from its driving motor.

4. Power transmitting mechanism comprising two independent motors, two transmitting devices operatively connected to said motors, two traction wheels, means connecting said transmitting devices to said traction wheels independently, means for actuating said transmitting devices in unison to cause them to drive their respective traction wheels at the same rate of speed, means for disconnecting either of said transmitting devices from its driving motor, and means for connecting said motors to cause them to turn in unison.

In testimony whereof, I sign this specification in the presence of two witnesses.

KARL A. KENDRICK.

Witnesses:
O. B. BAENZIGER,
I. G. HOWLETT.